| (12) | United States Patent | (10) Patent No.: US 11,815,913 B2 |
|---|---|---|
| | Jeong | (45) Date of Patent: Nov. 14, 2023 |

(54) MUTUAL RECOGNITION METHOD BETWEEN UNMANNED AERIAL VEHICLE AND WIRELESS TERMINAL

(71) Applicant: ARGOSDYNE CO. LTD., Seoul (KR)

(72) Inventor: Seung Ho Jeong, Gyeonggi-do (KR)

(73) Assignee: ARGOSDYNE CO. LTD., Seoul (KR)

( * ) Notice: Subject to any disclaimer, the term of this patent is extended or adjusted under 35 U.S.C. 154(b) by 712 days.

(21) Appl. No.: 16/960,877

(22) PCT Filed: May 15, 2018

(86) PCT No.: PCT/KR2018/005519
§ 371 (c)(1),
(2) Date: Jul. 8, 2020

(87) PCT Pub. No.: WO2019/198868
PCT Pub. Date: Oct. 17, 2019

(65) Prior Publication Data
US 2021/0055746 A1    Feb. 25, 2021

(30) Foreign Application Priority Data

Apr. 10, 2018 (KR) .................. 10-2018-0041726

(51) Int. Cl.
*G05D 1/10* (2006.01)
*B64C 39/02* (2023.01)
(Continued)

(52) U.S. Cl.
CPC ........... *G05D 1/101* (2013.01); *B64C 39/024* (2013.01); *B64D 47/08* (2013.01); *G05D 1/0094* (2013.01);
(Continued)

(58) Field of Classification Search
CPC .... G05D 1/101; G05D 1/0094; G05D 1/0016; G05D 1/0202; B64C 39/024;
(Continued)

(56) References Cited

U.S. PATENT DOCUMENTS

2009/0033173 A1   2/2009 Moura et al.
2016/0171330 A1   6/2016 Mentese et al.
(Continued)

FOREIGN PATENT DOCUMENTS

KR          10-1496654 B1      2/2015
KR      10-2016-0119990 A     10/2016
(Continued)

OTHER PUBLICATIONS

International Search Report of PCT/KR2018/005519 dated Jan. 9, 2019 from Korean Intellectual Property Office.

*Primary Examiner* — Adam R Mott
*Assistant Examiner* — Alyzia N Dilworth
(74) *Attorney, Agent, or Firm* — Revolution IP, PLLC (57) ABSTRACT

A mutual recognition method between an unmanned aerial vehicle (UAV) and a wireless terminal, includes: when an image of the UAV is positioned in a predetermined section of an imaging surface of an image sensor in the wireless terminal, receiving, by a server, first state information about the wireless terminal including information about a direction of an external magnetic field of the wireless terminal from the wireless terminal.

5 Claims, 10 Drawing Sheets

(51) Int. Cl.
- *B64D 47/08* (2006.01)
- *G05D 1/00* (2006.01)
- *H04N 5/38* (2006.01)
- *H04N 7/18* (2006.01)
- *G06V 20/10* (2022.01)
- *H04N 23/695* (2023.01)
- *H04W 88/02* (2009.01)
- *B64U 10/13* (2023.01)
- *B64U 101/30* (2023.01)
- *H04N 23/661* (2023.01)

(52) U.S. Cl.
CPC ............... *G06V 20/10* (2022.01); *H04N 5/38* (2013.01); *H04N 7/183* (2013.01); *H04N 23/661* (2023.01); *H04N 23/695* (2023.01); *B64U 10/13* (2023.01); *B64U 2101/30* (2023.01); *B64U 2201/00* (2023.01); *H04W 88/02* (2013.01)

(58) Field of Classification Search
CPC ........ B64D 47/08; G06V 20/10; G06V 20/17; G06V 10/235; H04N 5/38; H04N 7/183; H04N 23/661; H04N 23/695; H04N 7/185; B64U 10/13; B64U 2101/30; B64U 2201/00; B64U 2201/20; H04W 88/02; H04W 4/024; H04W 4/40; H04W 4/025; H04W 12/06

See application file for complete search history.

(56) References Cited

U.S. PATENT DOCUMENTS

| | | |
|---|---|---|
| 2016/0173742 A1* | 6/2016 | Hassan Zureikat ... B64C 39/028 348/144 |
| 2016/0297545 A1 | 10/2016 | Yang et al. |
| 2017/0050747 A1* | 2/2017 | Wessler ................. B64D 47/06 |
| 2018/0046201 A1* | 2/2018 | Erickson ................ G05D 1/106 |
| 2019/0250601 A1* | 8/2019 | Donahoe ............... G06F 3/0482 |

FOREIGN PATENT DOCUMENTS

| | | | |
|---|---|---|---|
| KR | 10-2016-0142017 A | 12/2016 | |
| KR | 10-2017-0070627 A | 6/2017 | |
| KR | 10-2017-0110341 A | 10/2017 | |
| WO | WO-2017201880 A1 * | 11/2017 | ............. B64C 39/02 |

* cited by examiner

MUTUAL RECOGNITION METHOD BETWEEN UNMANNED AERIAL VEHICLE AND WIRELESS TERMINAL

TECHNICAL FIELD

The present invention relates to a mutual recognition method between an unmanned aerial vehicle and a wireless terminal.

BACKGROUND ART

As a market of drones, which are unmanned aerial vehicles, is currently active, industries related to delivery of goods using drones, pickup services, and provision of emergency supplies are expanding.

Although several related technologies are being developed, there are technical issues regarding accurately authenticating and recognizing service users who request drone services, due to GPS location errors or obstacles such as surrounding structures.

More specifically, when location information about a recipient (user) is input, a drone flies toward the recipient through autonomous flight taking the location as a destination. However, with the current GPS technology, an error of 10 to 50 m occurs. In particular, when there are obstacles (for example, a wooded forest) that obstruct the view of the drone, or there are several unspecified people including a recipient at the destination (e.g., a park), it is difficult to identify the recipient from the drone perspective.

Performing authentication with a drone, a server, and a recipient connected to one another means not only that the drone and the server recognize that the recipient exists nearby, but also that the drone recognizes the recipient.

Therefore, after the recipient and the drone mutually authenticate each other (Authentication), a detection & marking operation should be performed to recognize the recipient. For this purpose, the drone needs to be moved to an open space where the drone is easily seen or there is no obstacle.

A patent document (Korean Patent Application Publication No. 10-2017-0110341, published on Oct. 11, 2017) related to a domestic accident information provision service discloses a delivery method using close range user identification in an autonomous delivery robot. The patent document conceptually discloses enabling a smooth and effective delivery service through an autonomous delivery robot configured to identify a user without the user contacting the robot even in the case of inaccurate location recognition when the robot arrives at a location near the user's location, so that is possible.

The document of the conventional user identification method relates to a technique allowing a drone to remotely identify a user, and fails to explicitly disclose a method for a drone to specify a user after the drone and the user mutual authenticate each other.

DISCLOSURE

Technical Problem

Therefore, the present disclosure has been made in view of the above problems, and it is one object of the present disclosure to provide a mutual recognition method between an unmanned aerial vehicle (UAV) and a wireless terminal that allows a UAV to move up to the air above a service user requesting a UAV (drone) service to perform mutual authentication with a user's wireless terminal (a smart device) through communication and to accurately recognize and specify the user after the authentication.

Technical Solution

In accordance with one aspect of the present disclosure, provided is a mutual recognition method between an unmanned aerial vehicle (UAV) and a wireless terminal including when an image of the UAV is positioned in a predetermined section of an imaging surface of an image sensor in the wireless terminal, receiving, by a server, first state information about the wireless terminal based on information about an external magnetic field of the wireless terminal from the wireless terminal.

In accordance with another aspect of the present disclosure, provided is a mutual recognition method between an unmanned aerial vehicle (UAV) and a wireless terminal including when an image of the UAV is positioned in a predetermined section of an imaging surface of an image sensor in the wireless terminal, receiving, by a server, second state information about the wireless terminal based on information about orientations of the wireless terminal from the wireless terminal.

In accordance with another aspect of the present disclosure, provided is a mutual recognition method between an unmanned aerial vehicle (UAV) and a wireless terminal including when an image of the UAV is positioned in a predetermined section of an imaging surface of an image sensor in the wireless terminal, transmitting, by the wireless terminal, first state information about the wireless terminal based on information about an external magnetic field of the wireless terminal to a server or the UAV.

In accordance with another aspect of the present disclosure, provided is a mutual recognition method between an unmanned aerial vehicle (UAV) and a wireless terminal including when an image of the UAV is positioned in a predetermined section of an imaging surface of an image sensor in the wireless terminal, transmitting, by the wireless terminal, second state information about the wireless terminal based on information about orientations of the wireless terminal to a server or the UAV.

In accordance with another aspect of the present disclosure, provided is a mutual recognition method between an unmanned aerial vehicle (UAV) and a wireless terminal including receiving, by the UAV, state information about the wireless terminal from a server or the wireless terminal, and controlling, by the UAV, flight of the UAV or panning or tilting of a camera in the UAV to position an image of a target having the wireless terminal on an imaging surface of the camera.

In accordance with another aspect of the present disclosure, provided is a mutual recognition method between an unmanned aerial vehicle (UAV) and a wireless terminal including receiving, by the UAV, a signal for controlling flight of the UAV or panning or tilting of a camera in the UAV from a server to position an image of a target having the wireless terminal on an imaging surface of the camera based on state information about the wireless terminal, and controlling, by the UAV, the flight of the UAV or the panning or tilting of the camera based on the signal.

The state information may be based on information about an external magnetic field of the wireless terminal or information about orientations of the wireless terminal.

The method may further include transmitting, by the server, a signal for controlling flight of the UAV or panning or tilting of the camera to the UAV to position an image of a target having the wireless terminal on an imaging surface of a camera in the UAV based on the first state information.

The method may further include capturing, by the UAV, an image of the target having the wireless terminal, and transmitting, by the UAV, the captured image to the server or the wireless terminal.

The method may further include receiving, by the wireless terminal, an image of a target having the wireless terminal captured by the UAV from the UAV or the server, outputting, by the wireless terminal, the image to an output unit in the wireless terminal, receiving, by the wireless terminal, an input of selection of an image portion for the target present in the image, and transmitting, by the wireless terminal, the image portion to the server or the UAV.

The first state information may include azimuth information about the wireless terminal. The azimuth information refers to an angle measured in a spherical coordinate system, and is calculated as an angle formed between a vector from an observer at the origin to an object and a reference vector on a reference plane obtained by perpendicularly projecting the vector onto the reference plane. The reference vector may be true north, grid north, or magnetic north.

The method may further include controlling the UAV to fly to follow the target identified based on the image.

In accordance with another aspect of the present disclosure, an application stored in a recording medium to execute the operations included in the method on the wireless terminal may be provided.

Advantageous Effects

According to the present disclosure, a mutual recognition method between a UAV and a wireless terminal may be provided.

According to the present disclosure, a mutual recognition method between an unmanned aerial vehicle (UAV) and a wireless terminal that allows a UAV to move up to the air above a service user requesting a UAV (drone) service to perform mutual authentication with a user's wireless terminal (a smart device) through communication and to accurately recognize and specify the user after the authentication may be provided.

BEST MODE

As the present disclosure may have various modifications and various embodiments, specific embodiments will be described in detail with reference to the accompanying drawings. However, this is not intended to limit the present disclosure to specific embodiments, and should be understood as including all modification, equivalents, and substitutes within the spirit and scope of the present disclosure. In describing the present disclosure, detailed descriptions of related known technologies may be omitted to avoid obscuring the subject matter of the present disclosure.

Terms including ordinal numbers such as first, second, etc. may be used to explain various constituents, but the constituents are not limited by the terms. The terms are used only for the purpose of distinguishing one constituent from another.

Terms used in this specification are merely adopted to explain specific embodiments, and are not intended to limit the present invention. A singular expression includes a plural expression unless the two expressions are contextually different from each other. In this specification, a term "include" or "have" is intended to indicate that characteristics, figures, steps, operations, constituents, and components disclosed in the specification or combinations thereof exist. The term "include" or "have" should be understood as not pre-excluding possibility of existence or addition of one or more other characteristics, figures, steps, operations, constituents, components, or combinations thereof.

REFERENCE NUMERALS

10: UAV
20: User wireless terminal
30: Server

MODE FOR INVENTION

Hereinafter, embodiments according to the present disclosure will be described in detail with reference to the accompanying drawings. In the description with reference to the accompanying drawings, the same or like parts are assigned the same reference numerals, and redundant description thereof will be omitted.

Terms such as first and second used hereinafter are only identification symbols for distinguishing the same or corresponding components, and the same or corresponding components are not limited by terms such as first and second.

In terms of a contact relationship between components, the term "coupling" is used to cover not only a case where a physical contact is directly made between components, but also a case where another element is interposed between the components, and thus the components are in contact with the element.

Regarding a computer program, the suffixes "module" and/or "unit" for a component may be a part of a computer program for operating the computer as a means of a specific function, or may be a part of a computer program for realizing a specific function in the computer. For example, module A can be interpreted as a computer program for operating the computer as means A or a computer program for realizing function A in the computer. In a method, a "step" may be implemented as a computer program on a computer and executed. In addition, "modules" and/or "units" may be combined to form a "group".

An application refers to a set of computer programs designed to perform a specific task, and is also called an application program. A user may add related functions installing an application according to an embodiment of the present disclosure on his or her electronic device.

An electronic device of the user on which the application is installed may be composed of CPU, RAM, ROM, and a storage device as in the case of a computer, a tablet, and a smartphone, and may be provided with an environment in which the entire system is controlled through a graphical operating system such as Windows, iOS, Android, and Linux.

In particular, the environment is specialized for smartphones capable of sending and receiving calls and text messages by registered contacts or provided with a camera to capture an image and transmit the captured image.

The flowcharts in the drawings attached herein are merely for explanation of the disclosure, and are not necessarily flowcharts to be perfectly implemented on a computer without a bug.

A terminal mentioned herein may be a typical user terminal such as a smartphone, a personal computer, or a tablet.

Figure 1:
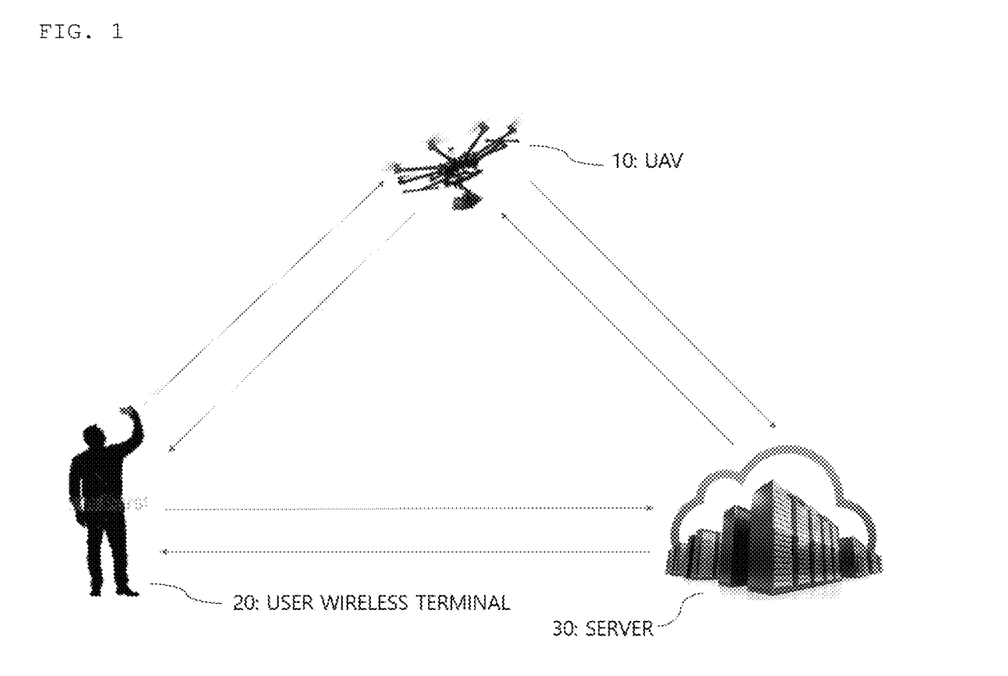
FIG. 1 is a diagram illustrating a communication connection relationship among a server, an unmanned aerial vehicle (UAV) and a wireless terminal according to the present disclosure.

FIG. 1 is a diagram illustrating a communication connection relationship among a server, an unmanned aerial vehicle (UAV) and a wireless terminal according to the present disclosure.

Referring to FIG. 1, a UAV 10, a user wireless terminal 20, and a server 30 may exchange data. In general, the UAV refers to an unmanned aerial vehicle having no person on board. However, the effect of implementation of the present disclosure is applicable to all flying vehicles that require the exact location and recognition of a user. Accordingly, the UAV according to the present disclosure may refer to transport means that is equipped with a capturing means (e.g., a camera) and sensors such as a geomagnetic sensor, a three-axis acceleration sensor, and a GPS (GNSS) and thus has information such as location coordinates and azimuth.

The user according to the present disclosure may be any user receiving a service by the UAV, including a recipient of a delivery service by the UAV, a user of a pickup service requesting UAV service to deliver goods to another place, and a user requesting a drone on demand capturing service.

In general, a server may exchange data with a UAV and a user's wireless terminal through wireless communication, but is not necessarily limited to wireless communication. Data may be exchanged through wired communication. In this specification, description of the technology related to exchange of data is omitted.

The server receives information transmitted from the UAV and/or the user wireless terminal when the UAV approaches a user having the wireless terminal for a predetermined purpose of providing a UAV utilizing service such as delivery of goods. Here, the information transmitted from the user wireless terminal may include UAV flight-related information, state information, user information, location information.

More specifically, the server transmits a command necessary for the operation (e.g., dispatch, authentication, guide, return, etc.) of the UAV to the UAV based on the state information including the user location information. In addition, the server may continuously monitor the situation according to abnormality of the UAV, the flight path, and the user's condition. In authenticating the UAV and the user, the server may calculate path adjustment data of the UAV required for landing and guide based on the relative position information, altitude information, and azimuth information about the user and the UAV. In addition, in performing landing, the server may calculate the location of the landing point of the UAV based on the location information and azimuth information about the user and transmit the same to the UAV.

The UAV continuously transmits all state information and flight-related information about the UAV including the location, speed, altitude, azimuth, and battery status to the server. In addition, the UAV may transmit information about the altitude, azimuth, and relative angle with respect to the user at the time of authentication with the user to the server.

The user wireless terminal transmits data, such as location, angle, and azimuth information about the wireless terminal and commands to the server. In addition, the user wireless terminal may display the UAV information and situation transmitted from the server.

Figure 2:
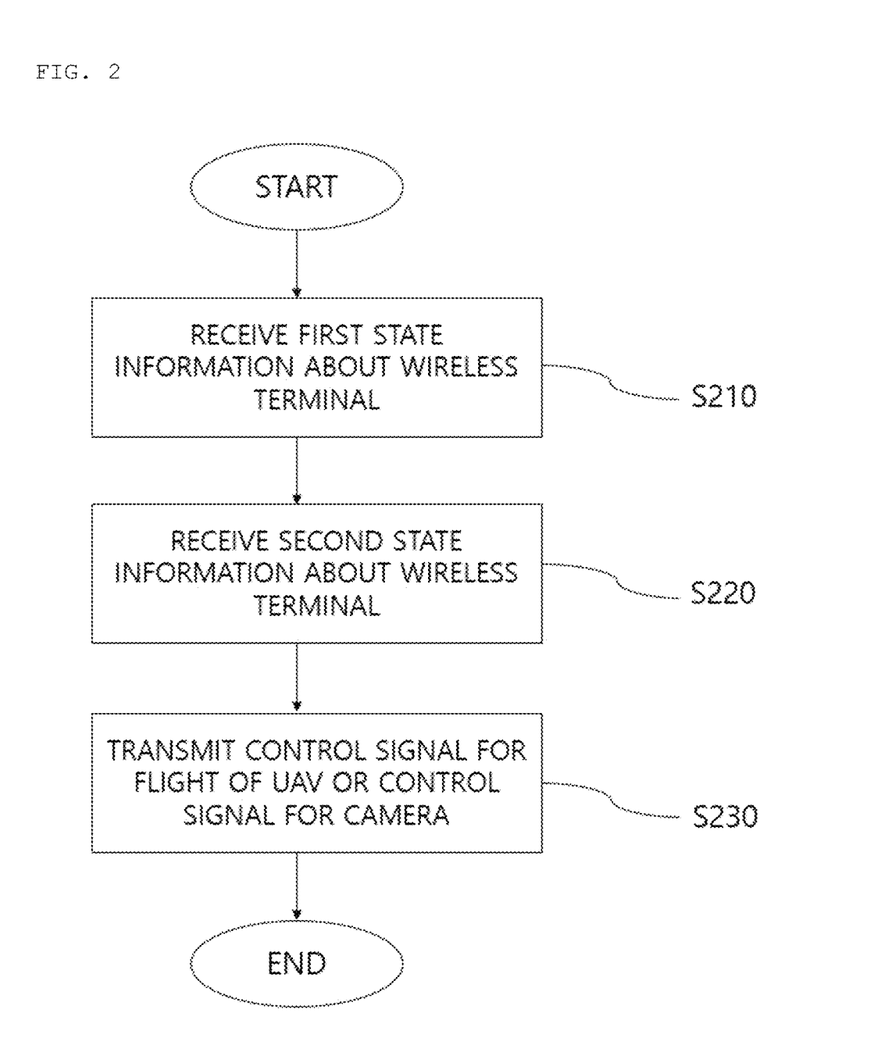
FIG. 2 is a flowchart illustrating a method according to the present disclosure from the perspective of the server.

FIG. 2 is a flowchart illustrating a method according to the present disclosure from the perspective of the server. Referring to FIG. 2, the method includes when an image of a UAV is positioned in a predetermined section of an imaging surface of an image sensor in a wireless terminal, receiving, by the server, first state information about the wireless terminal based on information about an external magnetic field of the wireless terminal from the wireless terminal (S210); when the image of the UAV is positioned in the predetermined section of the imaging surface of the image sensor in the wireless terminal, receiving, by the server, second state information about the wireless terminal based on information about orientation of the wireless terminal from the wireless terminal (S220); and transmitting, by the server, a signal for controlling flight of the UAV or panning or tilting of the camera to the UAV to position an image of a target having the wireless terminal on the imaging surface of the camera in the UAV based on the first state information (S230). Steps S210 and S220 need not be sequential and may be performed simultaneously or in a reverse order. In addition, only one of steps S210 and S220 may be present.

Here, the wireless terminal may be a general smartphone that may be gripped by an average user by hand. Also, an image sensor converts an optical image formed by a lens into an electrical signal, and the image sensor may include a charge coupled device (CCD), a metal oxide semi-conductor (MOS), and a complementary metal-oxide semiconductor (CMOS). However, the types of the image sensors are not limited thereto. In addition, the image may be a concept of a broad sense including a digital signal into which an optical signal is converted, and a result of outputting the digital signal as light visualized through a display device.

The imaging surface refers to the area of a device that serves to receive light in a light collecting part of a camera, such as a CCD or CMOS sensor of a film or digital camera, and refers to a place where an image of a subject is formed in the image sensor. The predetermined section means a specific portion of the imaging surface, and may generally be the center of the imaging surface. However, the predetermined section is not necessarily limited to the center. In addition, whether an image of the UAV is positioned in the predetermined section of the imaging surface may be consistent with whether the UAV is positioned on the display screen in the user wireless terminal, but the present disclosure is not limited thereto. In other words, even a terminal (e.g., a black box, etc.) without a display screen may be considered to be within the scope of the present disclosure if the terminal can determine whether the UAV is facing the terminal in the front. The main point of the present disclosure is to identify where the user terminal is located with respect to the UAV. In an embodiment of the present disclosure, it is simply stated that when an image of the UAV is formed on the imaging surface of the image sensor in the wireless terminal, the UAV and the user terminal directly face each other.

In addition, when it is determined that the UAV and the user terminal directly face each other, the relative locations or directions of the UAV and the user terminal may be calculated.

Next, the first state information may include information about external magnetic field of the wireless terminal. The information about the external magnetic field may be the magnetic field of the earth. More specifically, this information includes information about any property related to a magnetic field in general physics, including information (e.g., size and orientation) about the magnetic field formed outside the wireless terminal. An abrupt change of an external magnetic field occurring when the terminal of the present disclosure measures the external magnetic field is also a concept included in the external magnetic field information. For example, decrease of the external magnetic field after abrupt increase of the magnetic field is a concept related to changes in the magnitude of the magnetic field, which is included in the external magnetic field information. A rapid change in the direction of the magnetic field is also a concept included in the external magnetic field information. In other words, the information about the external magnetic field, which includes the concept of a change in the external magnetic field, includes a change in the magnitude or direction of the magnetic field over time. In addition, the first state information includes azimuth information, and may generally provide information on a two-dimensional plane. The first state information may be effectively utilized when the camera mounted in the UAV is positioned tilted downward.

Next, the second state information may include orientation information about the wireless terminal. The orientation information refers to the directional position information about the terminal, and may mean at least one of azimuth, tilt, and pan. The orientation information according to the present disclosure may indicate directional information in a three-dimensional space, and may be any attribute value indicating the orientate of an object. The orientation information about the wireless terminal may be obtained through an optical gyro sensor, a MEMS gyro sensor, or the like, but is not limited thereto. In addition, the second state information includes directional information, and may generally provide information about a three-dimensional plane.

In more detail, when an image of the UAV is positioned in a predetermined section of the imaging surface of the image sensor in the wireless terminal, the server may receive, from the wireless terminal, the first state information about the wireless terminal that is based on the information about the external magnetic field of the wireless terminal.

In other words, when a UAV such as a drone is captured by the camera of a wireless terminal such as a smartphone, the server may control the smartphone to measure an external magnetic field, that is, azimuth information. Thereby, the orientation (e.g., north, south, east, and west) of the wireless terminal at the moment when the wireless terminal gazes directly at the UAV may be measured.

When the image of the UAV is positioned in the predetermined section of the imaging surface of the image sensor in the wireless terminal, the server may receive the second state information about the wireless terminal that is based on the information about the orientation of the wireless terminal.

In other words, when a UAV such as a drone is captured by the camera of a wireless terminal such as a smartphone, the server may control the smartphone to measure the orientation, that is, relative direction information about the body of the wireless terminal with respect to a reference position of the UAV. Thereby, the relative direction between the UAV and the wireless terminal of the user at the moment when the wireless terminal gazes directly at the UAV may be measured.

Next, upon receiving the first or second state information, the server may control the UAV or the camera in the UAV based on the first or second state information. More specifically, the server may control the UAV to hover in a predetermined direction. For example, when the UAV initially reaches a delivery point, the UAV may hover in a predetermined direction (e.g., in the north direction). Then, when the first or second state information is received by the UAV through the server or directly from the wireless terminal, the UAV may calculate a direction in which the wireless terminal is gazing at the UAV based on the first or second state information. Thereafter, based on the calculation result, the camera in the UAV may be panned or the UAV may be controlled to rotate such that the camera may gaze at the wireless terminal. Thereby, the camera of the UAV may gaze directly at the wireless terminal.

Figure 3:
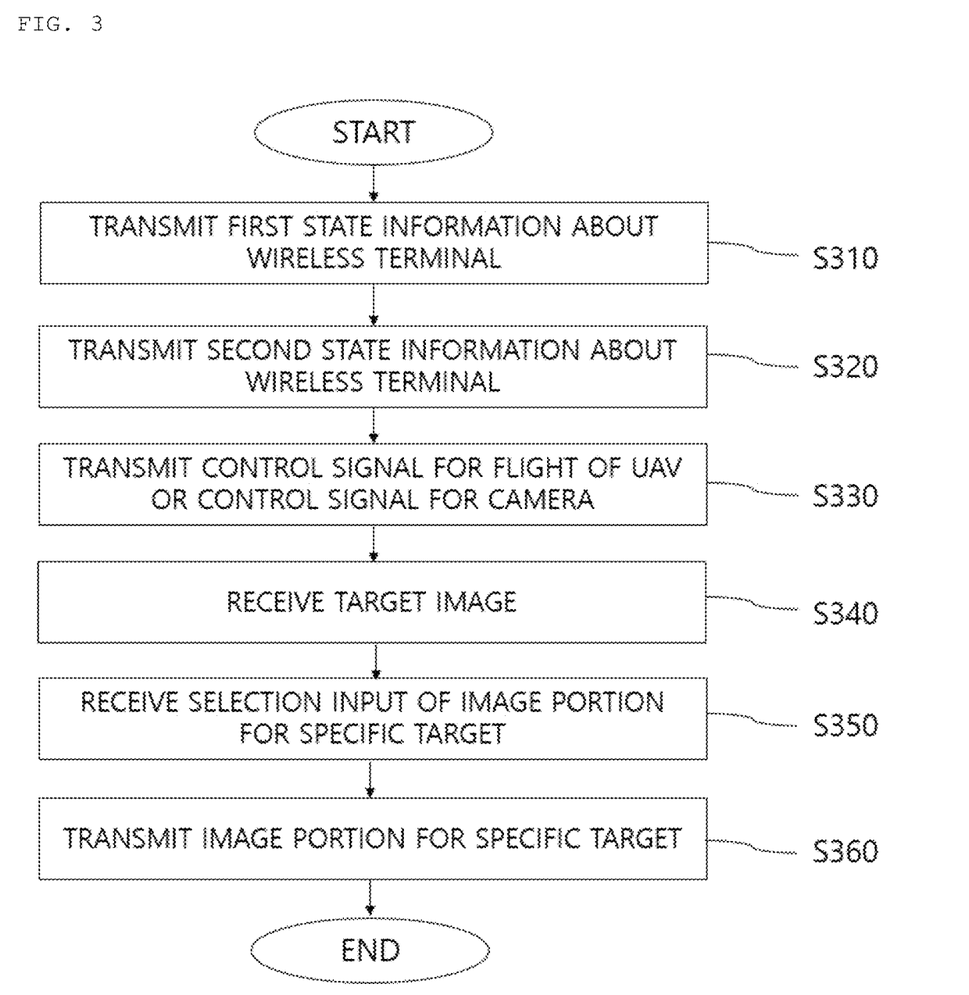
FIG. 3 is a flowchart illustrating the method according to the present disclosure from the perspective of the wireless terminal.

FIG. 3 is a flowchart illustrating the method according to the present disclosure from the perspective of the wireless terminal. Hereinafter, description will be given with reference to FIG. 3. However, description of the parts already described above will be omitted. Referring to FIG. 3, the method includes when an image of a UAV is positioned in a predetermined section of an imaging surface of an image sensor in a wireless terminal, transmitting, by the wireless terminal, first state information about the wireless terminal based on information about the external magnetic field of the wireless terminal to the server or the UAV (S310); when the image of the UAV is positioned in the predetermined section of the imaging surface of the image sensor in the wireless terminal, transmitting, by the wireless terminal, second state information about the wireless terminal based on the information about the orientation of the wireless terminal to the server or the UAV (S320); receiving, by the wireless terminal, an image of a target having the wireless terminal captured by the UAV from the UAV or the server (S330); outputting, by the wireless terminal, the image to an output unit in the terminal (S340); receiving, by the wireless terminal, an input of selection of an image portion for the specific target present in the image (S350); and transmitting, by the wireless terminal, the image portion to the server or the UAV (S360). Steps S310 and S320 need not be sequential, and may be performed simultaneously or in a reverse order. In an example, only one of steps S310 and S320 may be provided.

In more detail, when an image of the UAV is positioned in a predetermined section of the imaging surface of the image sensor in the wireless terminal, the wireless terminal may transmit, to the server or the UAV, the first state information about the wireless terminal that is based on the information about the external magnetic field of the wireless terminal.

When the image of the UAV is positioned in the predetermined section of the imaging surface of the image sensor in the wireless terminal, the wireless terminal may transmit, to the server or the UAV, the second state information about the wireless terminal that is based on the information about the orientation of the wireless terminal.

Next, the wireless terminal may receive an image of a target having the wireless terminal captured by the UAV from the UAV or the server, and output the image to an output unit in the terminal.

In other words, as the smartphone carried by the user transmits information about the external magnetic field or information about the orientation to the UAV or the server, the UAV may recognize the approximate location and orientation of the user. Thereafter, when the UAV reaches the air above the user, the UAV may photograph a predetermined range including the user, and the user may receive the captured image of the user from the UAV through the smartphone.

The captured image received from the UAV may be output through the display screen in the wireless terminal carried by the user. However, the output image may contain not only the user but also other objects or obstacles. For example, in a crowded place such as a park, several unspecified people may be contained in the image. In another case, when there are many trees in, for example, a forest, or a large number of tall buildings are present in, for example, a downtown area, obstacles such as trees or buildings may be contained in the image. In this case, the UAV may have difficulty in identifying and recognizing the user through the image. Therefore, it is necessary for the user to select an image portion for a specific target (user) using the wireless terminal and inform the UAV of the same. To this end, the user may select an image portion for the specific target from the image displayed on the display screen in the wireless terminal. The selection input may be provided through user manipulation such as screen touch or marking. The wireless terminal may transmit the selected image of the specific target to the server or the UAV. Thereby, the UAV may recognize the user specified through the user wireless terminal.

Figure 4:
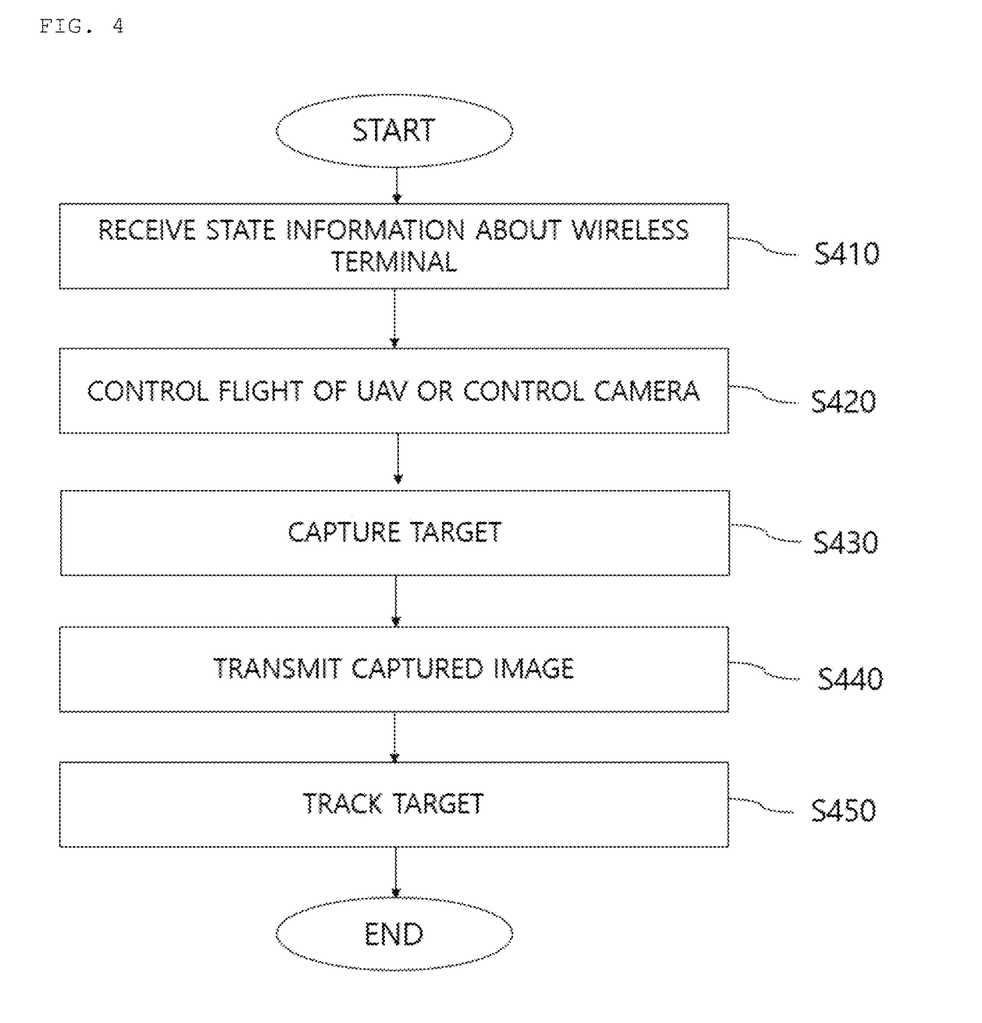
FIGS. 4 and 5 are flowcharts illustrating the method according to the present disclosure from the perspective of the UAV.
Figure 5:
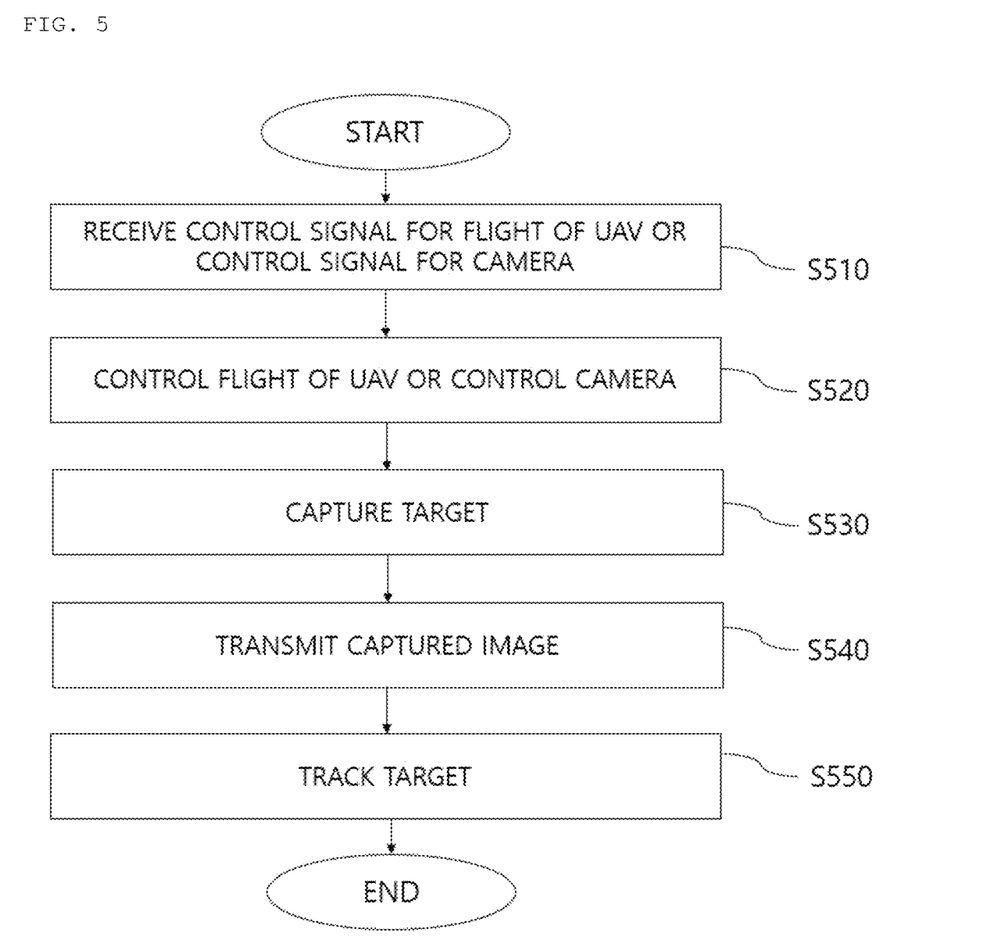

FIGS. 4 and 5 are flowcharts illustrating the method according to the present disclosure from the perspective of the UAV. Hereinafter, description will be given with reference to FIG. 4. However, description of the parts already described above will be omitted. Referring to FIG. 4, the UAV may directly control UAV flight, panning or tilting of the camera, and the like based on the state information about the wireless terminal. Specifically, the method includes receiving, by the UAV, state information about the wireless terminal from a server or the wireless terminal (S410); controlling, by the UAV, flight of the UAV or panning or tilting of a camera in the UAV to position an image of a target having the wireless terminal on the imaging surface of the camera (S420); capturing, by the UAV, an image of the target having the wireless terminal (S430); transmitting, by the UAV, the captured image to the server or the wireless terminal (S440); and controlling the UAV to fly to follow the target identified based on the image (S450).

Referring to FIG. 5, the UAV may receive a signal for control of flight of the UAV, panning or tilting of the camera, and the like calculated by the server based the state information about the wireless terminal, and perform a control operation according to a command of the server. Specifically, the method includes receiving, by the UAV, a signal for controlling flight of the UAV or panning or tilting of a camera in the UAV from a server to position an image of a target having the wireless terminal on an imaging surface of the camera based on state information about the wireless terminal (S510); controlling, by the UAV, the flight of the UAV or the panning or tilting of the camera based on the signal (S520); capturing, by the UAV, the target having the wireless terminal (S530); transmitting, by the UAV, the captured image to the server or the wireless terminal (S540); and controlling the UAV to fly to follow the target identified based on the image (S550).

In other words, the UAV may directly receive the state information about the wireless terminal or receive the same through the server.

In addition, the UAV may directly control the flight of the UAV or receive a control signal from the server and control the flight of the UAV according to a command of the server to position the image of the user having the wireless terminal on the imaging surface of the camera in the UAV based on the received state information about the wireless terminal.

In addition, the UAV may control panning or tilting of the camera of the UAV or may receive a control signal from the server and control panning or tilting of the camera of the UAV according to a command of the server to position the image of the user having the wireless terminal on the imaging surface of the camera in the UAV based on the received state information about the wireless terminal.

When the image of the user having the wireless terminal is positioned on the imaging surface in the UAV by controlling the flight of the UAV or panning or tilting of the camera of the UAV, the UAV may take the user having the wireless terminal as a target and capture an image of a predetermined range including the user. Then, the UAV may transmit the captured image to the server or the wireless terminal.

The UAV may fly to follow the target identified based on the captured image. Thereby, the user may guide the UAV to a place where the landing of the UAV is facilitated to receive a service such as delivery of goods from the UAV.

Figure 6:
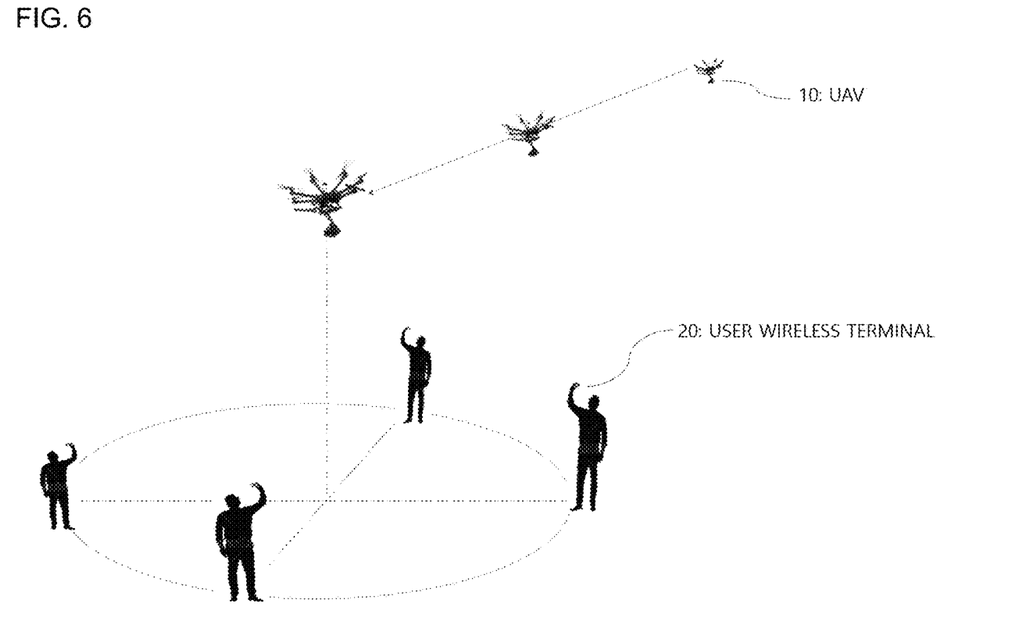
FIGS. 6 to 8 are diagrams illustrating a mutual recognition method between a UAV and a wireless terminal according to an embodiment of the present disclosure.
Figure 7:
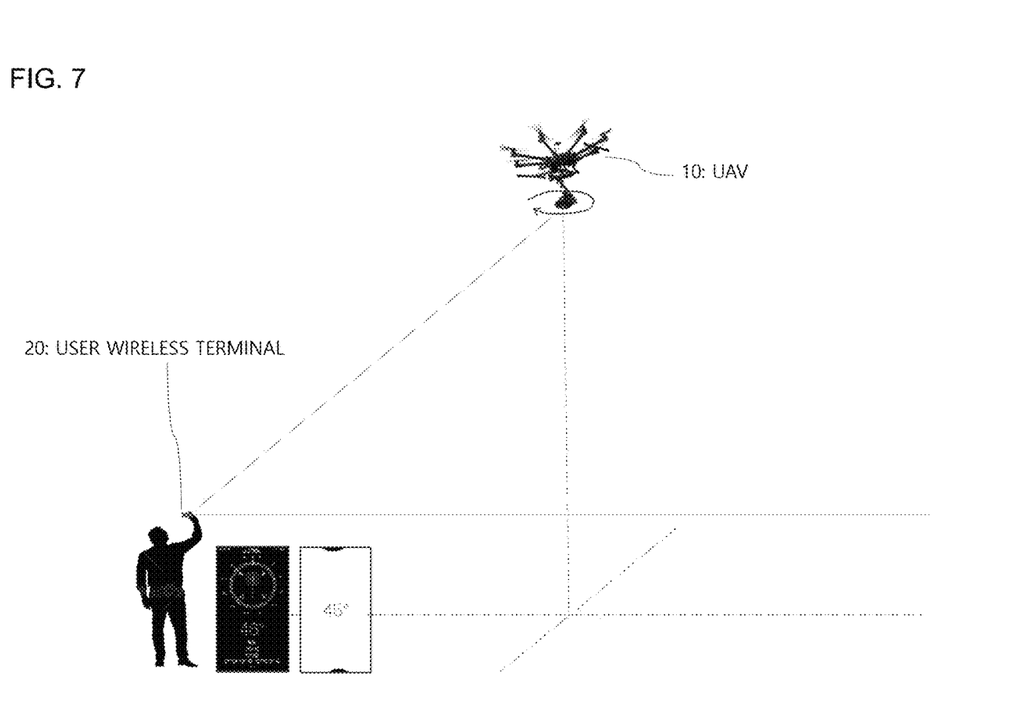
Figure 8:
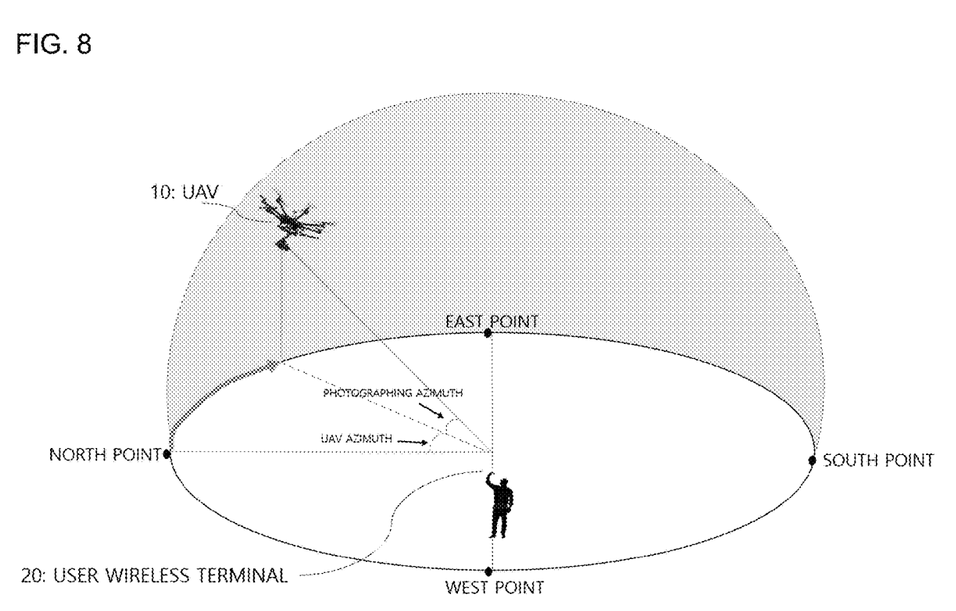

FIGS. 6 to 8 are diagrams illustrating a mutual recognition method between a UAV and a wireless terminal according to an embodiment of the present disclosure. Referring to FIG. 6, the UAV may move up to the air near the user based on the state information about the wireless terminal of the user. As the UAV moves to the location of the user, the UAV has certain directionality. Once the UAV reaches the air near the user, the UAV may hover while maintaining a predetermined orientation (e.g., a flight direction just before arrival). However, immediately after reaching the air near the user, the UAV merely recognizes an approximate range of the user location, and cannot identify the relative position and direction between the UAV and the wireless terminal of the user. In order for the UAV and the user to accurately recognize each other, the UAV needs to recognize the direction in which the wireless terminal is gazing at the UAV.

The process of recognizing the relative direction between the UAV and the wireless terminal of the user will be described later with reference to FIGS. 7 and 8. When the UAV arrives in the air above the location of the user, the user may photograph the UAV hovering in the air, using the wireless terminal the user is holding. Preferably, the user may photograph the UAV after moving to an open space free of obstacles.

More specifically, when an image of the UAV is positioned in a predetermined section (e.g., the center) of the imaging surface of the image sensor in the wireless terminal or the screen of the wireless terminal, the user may photograph the UAV through an input such as clicking a photographing button. However, a photographing error (e.g., hand tremor) may occur in performing an operation such as clicking the photographing button by the user. Accordingly, the photographing operation may be automatically performed by an application at the moment when the image of the UAV is formed at a specific position (e.g., center) on the imaging surface or the photographing screen. Through this photographing operation, the first state information and the second state information about the user wireless terminal may be transmitted to the server or the UAV. Here, the state information about the user wireless terminal may include the height at which the user wireless terminal is raised, the angle of inclination, and the angle of photographing.

The server or the UAV may calculate the relative orientation of the wireless terminal of the user with respect to the UAV by comparing the transmitted state information about the wireless terminal of the user and the location and azimuth information about the UAV at the arrival time, based on the transmitted state information about the wireless terminal.

More specifically, when the image of the UAV is formed on the imaging surface (or display screen) of the user wireless terminal, the azimuth position of the user relative to a heading point angle of the UAV may be calculated by comparing the hovering azimuth (heading point angle) of the wireless terminal of the user with the photographing angle and photographing orientation information about the user wireless terminal. Thereby, the server or the UAV may recognize where the user is located when the UAV is taken as an origin. In other words, as the location and direction of the user who wants to receive the corresponding UAV service is specified, the UAV and the user wireless terminal may mutually recognize each other.

Thereafter, the server or the UAV may control flight of the UAV (e.g., the hovering direction) or panning or tilting of the camera in the UAV while the UAV is hovering. Through such control, the UAV or the camera in the UAV and the user wireless terminal may directly gaze at each other, which means that the UAV may position an image of a predetermined range including the user on the imaging surface of the camera in the UAV. However, in order to provide an accurate UAV service, an operation for one-to-one matching between the UAV and the user needs to be additionally performed.

To this end, the UAV may capture an image of a predetermined range including the user at a time when the user wireless terminal and the UAV face each other. Thereafter, the UAV may transmit the captured image to the wireless terminal of the user. The transmitted image may be output on the display screen in the wireless terminal of the user, and the user may select an image portion for a specific target in the image output on the display screen in the wireless terminal.

Figure 9:
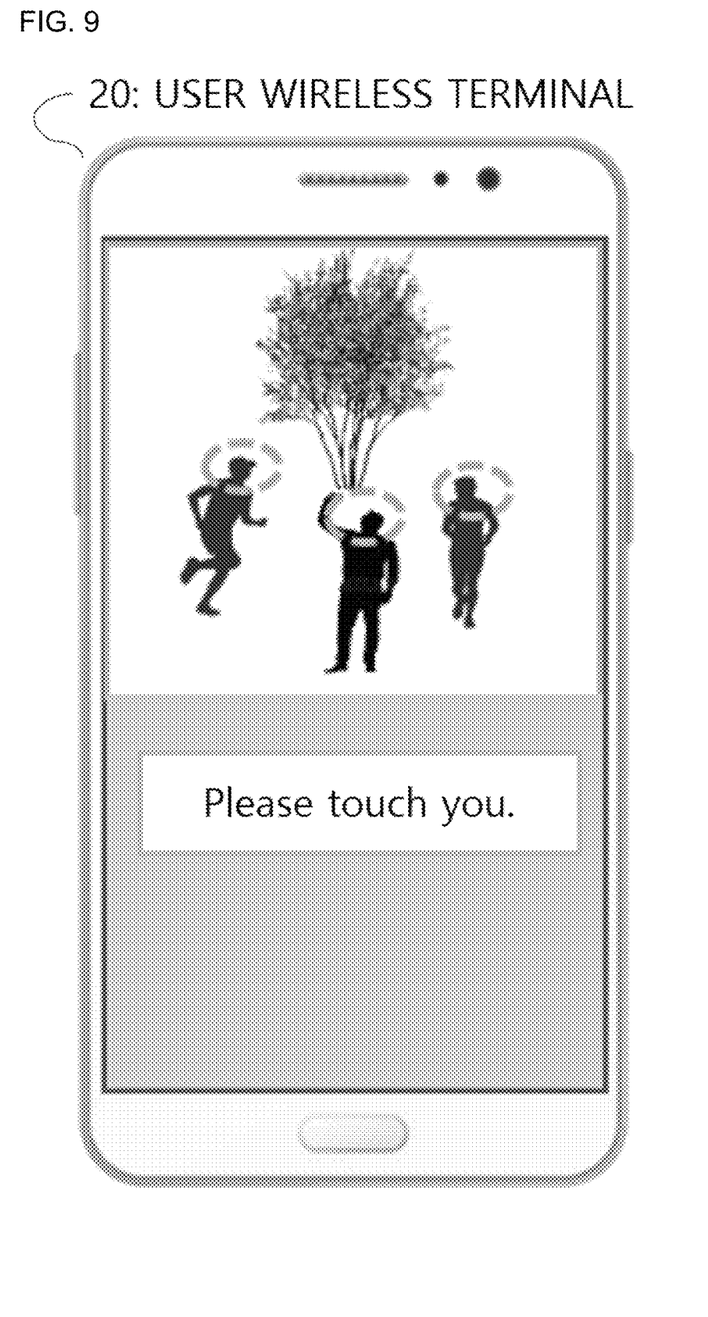
FIG. 9 is an exemplary view of a display screen for selecting an image portion for a specific target according to an embodiment of the present disclosure.

FIG. 9 is an exemplary view of a display screen for selecting an image portion for a specific target according to an embodiment of the present disclosure. Referring to FIG. 9, the user wireless terminal may receive a captured image related to a predetermined range including a user photographed by the UAV. The captured image may be displayed on the display screen in the wireless terminal. The user may select an image portion for a specific target in the image displayed on the display screen in the wireless terminal, and the selection input may be provided through user manipulation such as screen touch or marking. Thereafter, the wireless terminal may transmit the selected image of the specific target to the server or the UAV. Thereby, the UAV and the user may be matched with each other in a one-to-one correspondence manner.

The UAV may fly to follow the target identified based on the captured image. Thereby, the user may guide the UAV to a place where the landing of the UAV is facilitated to receive a service such as delivery of goods from the UAV.

Figure 10:
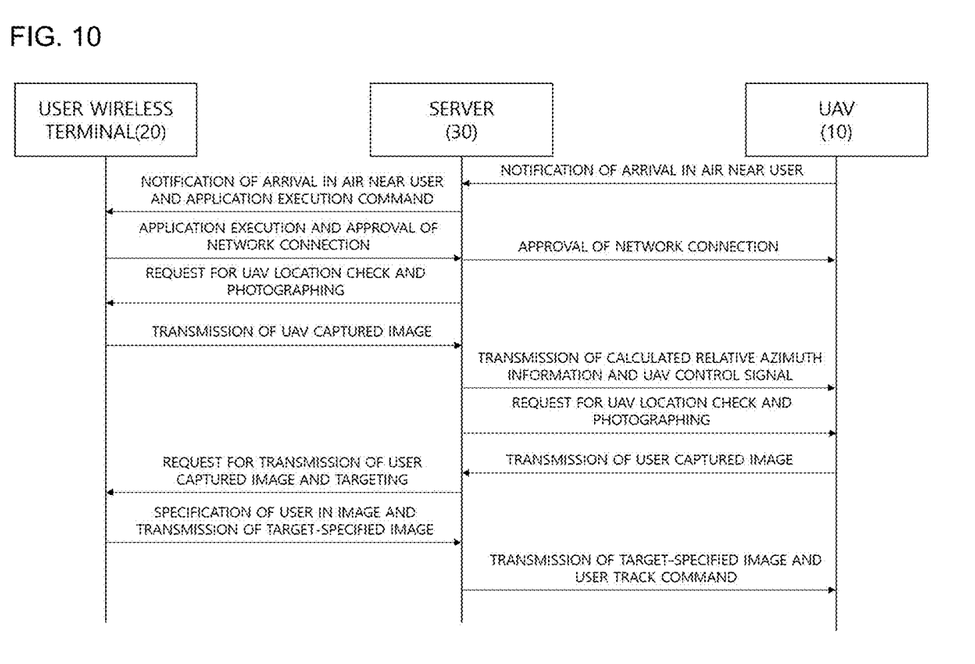
FIG. 10 illustrates an operation between a server, a UAV, and a user wireless terminal in an application to which the present disclosure is applied.

FIG. 10 illustrates an operation between a server, a UAV, and a user wireless terminal in an application to which the present disclosure is applied. Referring to FIG. 10, when a UAV having received a service request from a user and carrying an item or service arrives in the air near the user, the UAV may send the server a notification that the UAV has arrived in the air near the user. Next, the server may notify the user terminal of the arrival of the UAV and instruct the application to be executed. The application execution command may be announced to the user based on various functions that may be performed by the wireless terminal of the user, such as text notification, voice notification, or a general phone call. Next, when the user executes the application through a specific operation (e.g., touch, etc.) of accepting the notification, the network connection among the three parties of the user terminal, the server, and the UAV may be approved. When the network connection approval is completed, the server may make a request to the user terminal for checking the UAV location and capturing an image of the UAV. Next, when the user terminal captures an image of the UAV and transmits the captured image to the server, the server may calculate the relative azimuth information between the UAV and the wireless terminal of the user using the terminal state information included in the captured image. In addition, the server may transmit the direction of the UAV hovering in the air near the user or a control signal for panning/tilting of the camera in the UAV to the UAV according to the calculated relative azimuth information. The UAV may rotate to directly face the user terminal according to the control signal from the server. Next, the server may make a request to the UAV for checking the location of the user terminal and capturing an image of a predetermined range including the user. Then, when the UAV capture an image of the predetermined range including the user and transmits the captured image to the server, the server may transmit the same to the user terminal and select (target) a specific target in the transmitted captured user image. Next, the user may select an image portion for the specific target (e.g., the user) in the received captured image through an operation such as screen touch or marking, and retransmit the same to the server. Next, the server may transmit the target-specified image to the UAV, and may then instruct the UAV to track the specified target.

While the operations of the three parties of the user terminal, the server and the UAV is illustrated in this specification as an embodiment of the present disclosure, the entire process of the UAV service may be performed only through a network between the user wireless terminal and the UAV. This operation is also within the scope of the present disclosure.

The method and processing described above are in to be executed by, for example, a processor, a controller, or other processing devices and may be: encoded or stored in a compact disk read-only memory (CD-ROM), magnetic disk, an optical disc, a flash memory, a random access memory (RAM) or read only memory (ROM), an erasable programmable read only memory (EPROM), or other machine-readable or computer-readable media.

Such a medium may be implemented by an instruction executable system, apparatus, or device, or any device that contains, stores, communicates, propagates, or moves executable instructions for use in connection therewith. Alternatively or additionally, the method and processing may be implemented by analog or digital logic using hardware such as one or more integrated circuits, or one or more processor executable instructions; or by software of functions defined as an application programming interface (API), a dynamic link library (DLL), a local or remote procedure call or available in a shared memory; or by a combination of hardware and software.

In other implementations, the method may be represented by a signal or radio-signal medium. For example, the instructions for implementing the logic of any given program may take the form of an electrical, magnetic, optical, electromagnetic, infrared or other type of signal. The system described above may receive these signals through a communication interface, such as a fiber optic interface, an antenna, or another analog or digital signal interface, restore instructions from the signals, store the instructions in a machine-readable memory, and/or execute the same using a processor.

In addition, the present invention may be implemented in hardware or software. The invention may also be implemented as computer-readable code on a computer-readable recording medium. The computer-readable recording medium includes all kinds of recording devices in which data that may be read by a computer system is stored. Examples of computer-readable recording media include ROM, RAM, CD-ROM, magnetic tapes, floppy disks, and optical data storage devices, and also include carrier-wave type implementation (e.g., transmission over the Internet). The computer-readable recording medium may be distributed to a computer system connected over a network, and computer-readable code may be stored and executed thereon in a distributed manner. Functional programs, code, and code segments for implementing the method described above may be easily inferred by programmers in the art to which the embodiments pertain.

Embodiments of the present disclosure may include a carrier wave having electronically readable control signals that may be operated with a programmable computer system on which one of the methods described herein is executed. Embodiments of the disclosure may be implemented as a computer program product having program code, the program code being operated to execute one of the methods when the computer program is run on a computer. The program code may be stored on, for example, a machine-readable carrier. One embodiment of the disclosure may be a computer program having program code for executing one of the methods described herein when the computer program is run on a computer. The disclosure may include a computer or a programmable logic device for performing one of the methods described above. Programmable logic devices (e.g., field programmable gate arrays, complementary metal oxide semiconductor based logic circuits) may be used to perform some or all of the functions described above.

Although an embodiment of the present disclosure has been described above, it is apparent to those skilled in the art that various modifications and changes can be made to the present disclosure by adding, changing, or deleting components within the scope not departing from the spirit of the present disclosure as set forth in the claims. Such modifications and changes are also within the scope of the present disclosure.

INDUSTRIAL APPLICABILITY

The mutual recognition method between a UAV and a wireless terminal according to embodiments of the present disclosure may be used in a series of procedures for landing of a UAV such as a drone.

The invention claimed is:

1. A mutual recognition method between an unmanned aerial vehicle (UAV) and a wireless terminal for carrying an item or service to a user, comprising:

receiving, by the UAV, a signal for controlling flight of the UAV or panning or tilting of a camera in the UAV from a server to position an image of a target having the wireless terminal on an imaging surface of the camera based on state information about the wireless terminal;

receiving, by the wireless terminal, the image of the target having the wireless terminal captured by the UAV from the UAV or the server;

receiving, by the UAV, the state information about the wireless terminal from the server or the wireless terminal;

receiving, by the UAV, user information, user location information, a command necessary for the operation of the UAV from the server;

controlling, by the UAV, the flight of the UAV or the panning or tilting of the camera based on the signal for determining whether the UAV and the wireless terminal directly face each other;

sending, by the UAV, a notification to the server that the UAV has arrived in the air near the user when the UAV receives a service request from the user, carries the item or service, and arrives in the air near the user;

notifying, by the server, the wireless terminal of the arrival of the UAV;

instructing, by the server, the wireless terminal to execute an application installed in the wireless terminal;

outputting, by the wireless terminal, the image of the target via an output unit in the wireless terminal;

receiving, by the wireless terminal, an input of selection of an image portion for the target present in the image; and transmitting, by the wireless terminal, the image portion to the server or the UAV, wherein the input of selection is provided via a screen touch or marking by the user, wherein a photographing operation is automatically performed by the wireless terminal when an UAV image is formed at a specific position on the imaging surface of the camera, wherein the state information includes an information about an external magnetic field of the wireless terminal and an orientation information of the wireless terminal, wherein the external magnetic field is the magnetic field of the earth, wherein the orientation information is a directional position information which is at least one of azimuth, tilt, and pan of the wireless terminal.

2. A mutual recognition method between an unmanned aerial vehicle (UAV) and a wireless terminal for carrying an item or service to a user, comprising:

receiving, by the UAV, state information of the wireless terminal from a server or the wireless terminal;

receiving, by the UAV, user information, user location information, a command necessary for the operation of the UAV from the server;

controlling, by the UAV, flight of the UAV or panning or tilting of a camera in the UAV to position an image of a target having the wireless terminal on an imaging surface of the camera for determining whether the UAV and the user terminal directly face each other; and sending, by the UAV, a notification to the server that the UAV has arrived in the air near the user when the UAV receives a service request from the user, carries the item or service, and arrives in the air near the user, wherein the state information is based on information about an external magnetic field of the wireless terminal or information about orientations of the wireless terminal, wherein the external magnetic field is the magnetic field of the earth and wherein the orientations of the wireless terminal are defined as at least one of azimuth, tilt, and pan.

3. A mutual recognition method between an unmanned aerial vehicle (UAV) and a wireless terminal comprising:

when an image of the UAV is positioned in a predetermined section of an imaging surface of an image sensor in the wireless terminal, receiving, by a server, a first state information about the wireless terminal, the first state information having a directional information of an external magnetic field of the wireless terminal from the wireless terminal or a second state information about the wireless terminal, the second state informing having an orientation information of the wireless terminal from the wireless terminal;

transmitting, by the server, a signal for controlling flight of the UAV or panning or tilting of a camera in the UAV to position an image of a target having the wireless terminal on an imaging surface of the camera in the UAV based on the first state information in order for the camera of the UAV to gaze directly at the wireless terminal;

notifying, by the server, the wireless terminal of the arrival of the UAV; and instructing, by the server, the wireless terminal to execute an application installed in the wireless terminal, wherein the external magnetic field is the magnetic field of the earth, wherein the orientation information is defined as at least one of azimuth, tilt, and pan.

4. A mutual recognition method between an unmanned aerial vehicle (UAV) and a wireless terminal comprising:

when an image of the UAV is positioned in a predetermined section of an imaging surface of an image sensor in the wireless terminal, transmitting, by the wireless terminal, a first state information about the wireless terminal, the first state information having a directional information of an external magnetic field of the wireless terminal to a server or the UAV or a second state information about the wireless terminal, the second state information having an orientation information of the wireless terminal to the server or the UAV;

receiving, by the wireless terminal, an image of a target having the wireless terminal captured by the UAV from the UAV or the server;

outputting, by the wireless terminal, the image of the target to an output unit in the wireless terminal;

receiving, by the wireless terminal, an input of selection of an image portion for the target present in the image of the target; and transmitting, by the wireless terminal, the image portion to the server or the UAV, wherein the input of selection is provided via a screen touch or marking by the user, wherein a photographing operation is automatically performed by the wireless terminal when an UAV image is formed at a specific position on an imaging surface of a camera, wherein the external magnetic field is the magnetic field of the earth, wherein the orientation information is a directional position information which is at least one of azimuth, tilt, and pan of the wireless terminal.

5. A non-transitory computer-readable recording medium storing thereon an application to execute the operations included in the method of claim 4 on the wireless terminal.

* * * * *